Figure 1:
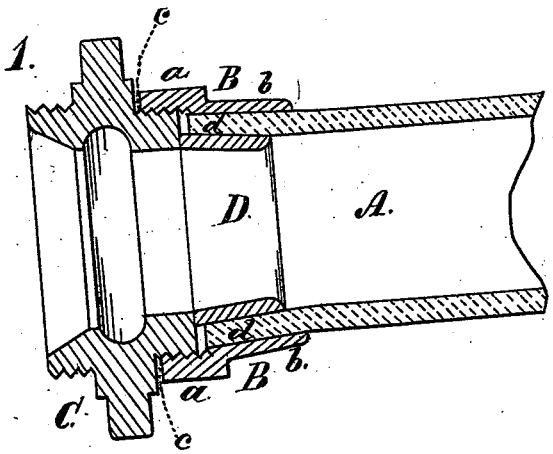

E. A. LELAND.
HOSE-COUPLINGS.

No. 187,395. Patented Feb. 13, 1877.

Witnesses:
Henry Eichling
H. Wells Jr.

Inventor:
Edwin A. Leland
per James A. Whitney
Atty.

UNITED STATES PATENT OFFICE.

EDWIN A. LELAND, OF BROOKLYN, NEW YORK, ASSIGNOR TO LEONARD RICHARDSON, OF SAME PLACE.

IMPROVEMENT IN HOSE-COUPLINGS.

Specification forming part of Letters Patent No. 187,895, dated February 13, 1877; application filed October 17, 1876.

*To all whom it may concern:*

Be it known that I, EDWIN A. LELAND, formerly of New York city, but now residing in Brooklyn, in the county of Kings and State of New York, have invented an Improvement in Hose-Couplings, of which the following is a specification:

In order to secure the attachment of a hose to the nut whereby it is attached to its coupling-section, it has been customary to insert within the hose, concentric with the aforesaid nut, a copper ring, which, being forcibly expanded by means of special appliance of an apparatus devised for the purpose, and the ring remaining set after such expansion, confines the intervening portion of the hose snugly between said copper ring and the external or surrounding portion of the nut. This plan has proved of considerable utility; but, inasmuch as it is necessary to remove the hose and its coupling-section to a workshop, and to use special tools and appliances in the attachment of the hose to such coupling-section by means of the copper ring, as just described, this method is wholly and entirely inapplicable to those emergencies in which (as, for example, during conflagrations) it is frequently necessary to attach a length of hose to a coupling-section for immediate use.

The object of my invention is to provide a means whereby this attachment of the end of the hose to its coupling-section may be almost instantaneously performed, even during the confusion and the lack of useful appliances incident to the actual use of hose during the fire. This I accomplish by means of my present invention—namely, the combination of a tapering internal ring of lead inserted within the end of the hose concentric with the correspondingly-tapered surrounding portion of the nut, and expanded by a simple expansion tool or reamer, in such manner as to crowd the hose against the surrounding portion of the nut, and confine the same firmly and solidly to the said nut. This attachment of the hose to the nut by means of an internal ring of lead differs not only in availability, but in *modus operandi*, from the hereinbefore-specified employment of a copper ring for the same purpose; for this reason, that the copper, being practically incapable of flowing upon itself when inserted, is crowded upon the substance of the hose by merely radial pressure, and, in the event of inequalities in the thickness of the hose, fails to confine it with equal firmness at all portions of its circumference; whereas, the lead, flowing upon itself—in other words, being in a great degree plastic, and at the same time firm when brought to place—is molded to the hose, fitted to the inequalities of the latter, and caused to exert equal pressure at all portions of the same, so that by this means I am enabled to attach the hose to the nut by hand without the aid of any special appliance, and without the removal of the same to a workshop, and secure a firmer and more solid hold or attachment of the hose to the nut than is possible with the copper, incapable of flowing upon itself, as just set forth, the hold of the lead and the nut upon the portion of the hose embraced between them being, moreover, aided by the tapering form given to the ring of lead.

Figure 2:
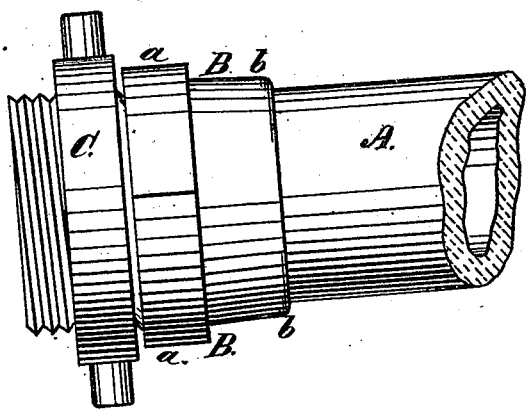
Figure 3:
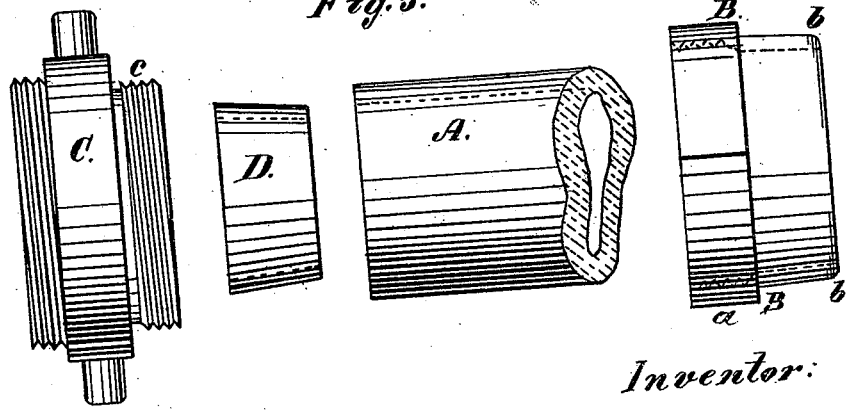

Figure 1 is a longitudinal sectional view of a coupling made according to my invention. Fig. 2 is a side view of the same. Fig. 3 is a side view of the several parts comprised in said coupling detached from each other.

A is the end of the hose. B is the nut whereby it is attached to the coupling-section, and C is the section or half of an ordinary coupling. The nut B comprises the cylindric internally-threaded part $a$ and the tapering hollow portion $b$, the part $a$ screwing upon the adjacent external thread $c$ of the coupling-section C, in the ordinary manner. The end of the hose A is thrust into the tapered portion $b$ of the nut B, and there is then forced within the said end of the hose A a ring of lead, D. This ring D, by the insertion of a tapering tool or reamer, is then expanded into tapering form, nearly or quite coincident with the taper of the part $b$ of the nut B, and the expansion of this leaden ring D is continued until the pressure exerted by its outward movement gripes the end portion $d$ of the hose between the said ring and the part $b$ of the nut B. It is to be observed that during this expansion of the leaden ring D, which is principally accomplished by an axial movement given to the tapering tool or reamer simultaneous with the forcing inward of the same, the lead is caused to flow upon itself—in other words, to be molded to fit into the inequalities of the end portion $b$ of the hose A, and thereby exert a uniform pressure or gripe upon all parts of said end portion $b$, thereby insuring a firm and equal hold upon said part of the hose A at all portions of its circumference, the end portion $d$ of the hose being rendered flaring by its compression upon the flaring inner surface of the part $b$ of the nut B by the joint action of the outward pressure of the expanded leaden ring D and the flaring form given to it. Between said end $b$ and the flaring portion of the nut B the end of the hose is firmly, strongly, and tightly griped, and thereby securely attached to the nut B. It will be noticed that this expansion of the leaden ring D may be effected by hand by use of one of the simplest implements, and requiring no special skill or manipulation to effect the firm attachment of the nut B to the end of the hose, so that, the said nut being readily secured upon the coupling-section C, provision is made for the coupling of a new hose, to replace a ruptured or otherwise injured hose during the exigencies of actual use in fires, &c.—a result not hitherto practically accomplished by any means known in the art to which my said invention relates.

What I claim as my invention is—

The internal leaden ring D, expanded to tapering form, in combination with the nut B, constructed with the tapering portion $b$ and the end portion of the hose A, griped between the expanded leaden ring D and the tapering part of the nut B, all in the manner herein set forth, for the purpose specified.

EDWIN A. LELAND.

Witnesses:
EDWARD HOLLY,
H. WELLS, Jr.